Aug. 2, 1955
H. L. VOIGT ET AL
2,714,368
CALF FEEDING DEVICES
Filed May 1, 1953
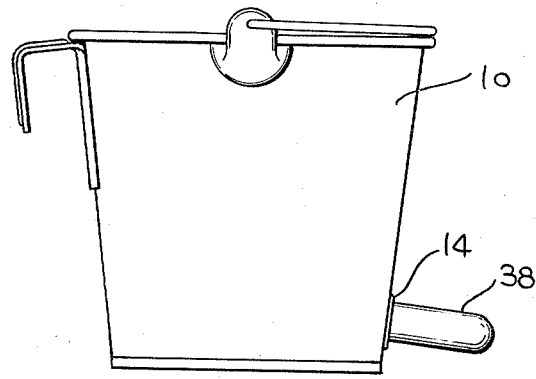
FIG. 1
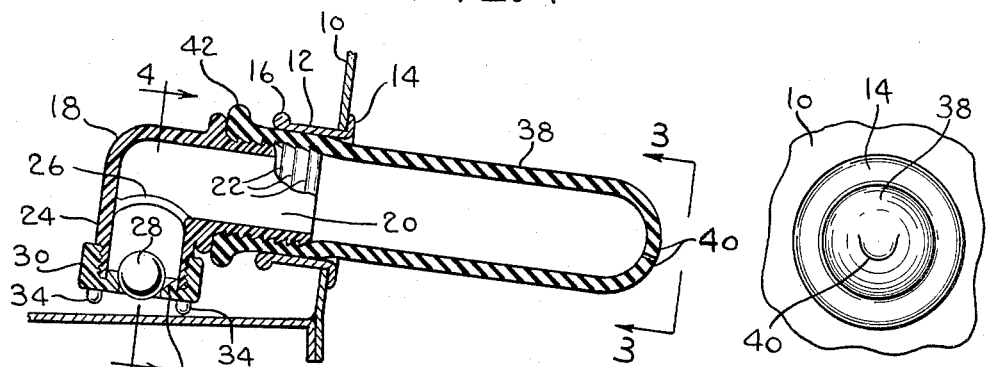
FIG. 2
FIG. 3
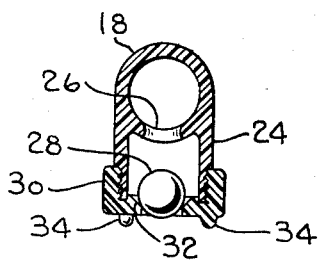
FIG. 4
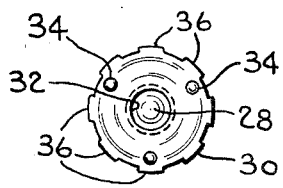
FIG. 5
*INVENTOR.*
HERBERT L. VOIGT
RAYMOND N. SELLON, JR.
By *John W. Michael*
ATTORNEY

United States Patent Office 2,714,368
Patented Aug. 2, 1955

2,714,368

CALF FEEDING DEVICES

Herbert L. Voigt and Raymond N. Sellon, Jr., Milwaukee, Wis., assignors to Geuder, Paeschke & Frey Co., Milwaukee, Wis., a corporation of Wisconsin Application May 1, 1953, Serial No. 352,560

1 Claim. (Cl. 119—71)

This invention relates to improvements in calf feeding pails and suckling appliances.

One object of this invention is to provide a nipple and valve assembly which may be easily and quickly inserted and removed from firm leak proof connection with the opening in the pail without injury to the nipple and still withstand the pushing and pulling of the calf.

Another object of this invention is to provide a valve which is easy to clean, will withstand corrosion, and permit substantially complete drainage and prevent sediment sucking.

The novel features, which are considered characteristic of the invention, are set forth with particularity in the appended claim. The invention itself, however, both as to its organization and its method of operation, together with additional objects and advantages thereof, will best be understood from the following description of a specific embodiment when read in connection with the accompanying drawing, in which:

Fig. 1 is a view in side elevation of a calf feeding pail embodying the present invention;

Fig. 2 is an enlarged fragmentary sectional view of the ferrule, nipple and valve embodying the present invention;

Fig. 3 is a fragmentary view in end elevation taken from the line 3—3 of Fig. 2;

Fig. 4 is a sectional view taken on the line 4—4 of Fig. 2; and

Fig. 5 is an enlarged bottom view of the cap as viewed from below Fig. 4.

Referring to the drawings by reference numerals a galvanized iron pail 10 is provided with an inwardly extending ferrule 12 which defines the outlet from the pail. This ferrule has an outer flange 14 which is rigidly secured to the outside of the pail and a bead 16 on the inner end. Thus there is provided a smooth extra large seating surface for a rubber nipple and valve so that a tight leak proof seal and support may be established between the nipple and pail without damage to the nipple. Because the inner surface of the ferrule is smooth, the nipple and valve may be easily inserted and removed as a unit without damage.

A valve body 18, made of clear plastic, has a neck 20 and an intake leg 24 positioned at right angles to each other to form an L or elbow shape to the body. The neck 20 defines the outlet and provides the connection and support for the nipple. It has externally raised rings 22 of tooth-like section which provide engaging the inner wall of the nipple. The intake leg 24 is externally threaded at its lower end to removably hold a cap 30 defining an intake. At the juncture between the neck 20 and leg 24 on the inner surface of the valve there is provided a pair of oppositely positioned ball restraining flanges 26. The space between such flanges is small enough to prevent a ball from passing therebetween and large enough to permit unrestricted normal flow of feed through the valve.

A plastic colored ball 28 is loosely held within the leg 24 by an internally threaded cap 30 which screws onto the end of such leg. This cap has an inlet opening provided with an upwardly facing seat 32. The ball 28 rests on such seat to provide a check against outward flow through such inlet. It is advisable to provide the cap 30 with a plurality of knob-like spacers 34. These spacers hold the inlet from the bottom of the pail and prevent the drawing of sediment from the bottom of the pail. However, the inlet in the cap is only about 5/16" from the bottom of the pail and approximately 99% of the contents of the pail may be drained in normal operation. The cap 30 may have ridges 36 on its periphery to enable it to be more easily manually grasped and threaded and unthreaded.

A conventional white rubber nipple 38 having the usual split opening 40 and bead 42 is pressed over the neck 20 so that its inner surface is engaged by the rings 22. There is a sufficient gripping action between the neck and such nipple to prevent the valve from being blown away from the nipple when in normal operation the nipple is squeezed and internal pressure created. With the nipple inserted on the valve, the unit may be readily inserted in the pail from the inside by pushing the nipple out through the ferrule 12 with the cap 30 facing the bottom of the pail. By gripping the nipple 40 from outside of the pail and using a gentle rocking action, the inner end of the nipple and the neck 22 will be drawn within the ferrule 12 compressing the rubber of the nipple at this point and making a firm support and tight seal with the pail. Such support will resist the pushing action of the calf during feeding and yet the unit may be easily removed by rocking the valve and pulling it inwardly of the pail. This insertion and withdrawal does not in any way damage or injure the nipple. However, the frictional resistance developed between the close-fitting smooth surfaces is more than sufficient to prevent the nipple and valve unit from being dislodged from the ferrule during the normal pushing and pulling asserted by the feeding calf.

To thoroughly clean the valve after the unit is removed from the pail it is only necessary to remove the nipple, unscrew the cap 30, and remove the ball 28. All the valve parts, being made from a plastic which will withstand boiling temperature, may be easily sterilized and cleaned. All of the inside surfaces of the valve body are smooth and rounded and there are no hard to get at corners or crevices. Thus cleaning is made easier and better.

Although only one embodiment of the invention is shown and described herein, it will be understood that this application is intended to cover such changes or modifications as come within the spirit of the invention or scope of the following claim.

We claim:

A feeding pail having an outlet formed by a ferrule secured thereto, said ferrule having an elongated cylindrical opening of constant diameter throughout to provide an unobstructed smooth inner surface for engaging the outer surface of a nipple, a rubber nipple fitted within said ferrule and in engagement with said smooth inner surface, said nipple having an open end spaced inwardly of said ferrule, a valve having an elbow shaped body molded of clear plastic and having a neck and inlet leg at substantially right angles to each other, said neck having externally raised sharp edged rings fitted within said open end of said nipple and engaging the inner surface of said nipple, said neck extending within the confines of said ferrule whereby said neck and said smooth inner surface of said ferrule squeeze said nipple therebetween to maintain said nipple and valve in place in said ferrule subject to removal as a unit upon gently rocking and applying withdrawal force inwardly, said inlet leg being externaly threaded to hold a cap on the end thereof, ball restraining flanges formed on the inner surface of said valve body at the juncture of said neck and said inlet leg so as to be formed by cores withdrawable from said neck and leg, a cap threadedly connected to said inlet leg and having an inlet opening provided with a valve seat spaced from and spacing said neck, and an opaque ball loosely retained between said cap and said flanges to provide a check for said inlet opening.

References Cited in the file of this patent

UNITED STATES PATENTS

| | | |
|---|---|---|
| 1,399,828 | Traynor | Dec. 13, 1921 |
| 1,972,375 | Coyner | Sept. 4, 1934 |
| 2,535,158 | Rhinehart | Dec. 26, 1950 |
| 2,652,027 | Coyner | Sept. 15, 1953 |